April 19, 1955  T. V. PEDERSEN  2,706,489
PRESSURE RELIEF VALVE
Filed April 7, 1951  2 Sheets-Sheet 1

INVENTOR.
Tage V. Pedersen
BY
Paul L. Kirber
Atty.

April 19, 1955     T. V. PEDERSEN     2,706,489
PRESSURE RELIEF VALVE

Filed April 7, 1951     2 Sheets-Sheet 2

INVENTOR.
Tage V. Pedersen
BY
Paul L. Kirker
Atty.

United States Patent Office 2,706,489
Patented Apr. 19, 1955

2,706,489

PRESSURE RELIEF VALVE

Tage V. Pedersen, Roscoe, Ill., assignor to Fairbanks, Morse & Co., Chicago, Ill., a corporation of Illinois Application April 7, 1951, Serial No. 219,818

6 Claims. (Cl. 137—488)

This invention relates to a pressure relief valve for hydraulic systems, and more particularly to a valve of improved character, for relieving excessive pressure discharge of a fluid pump supplying high pressure operating fluid to fluid-actuated motors and the like.

In the instance of hydraulic power systems in particular, wherein the hydraulic pressures are of the order of several thousand pounds per square inch, it has been found that pressure relief valves of known and prevailing forms are subject to certain operating disadvantages which make them unsuitable for application to pressure relief of high pressure pump equipment. Such valves in many instances, are not sufficiently sensitive, nor is their relief action uniform.

It is the primary purpose of the present invention then, to provide a relief valve suitable in particular for pressure relief of a fluid pump in a high pressure system, and which avoids the disadvantages including those above indicated, characterizing available forms of relief valves.

Pursuant to the foregoing purpose, it is an object of the invention to provide an improved relief valve embodying a main valve unbalanced in the direction of valve closure, and a pilot valve embodied in the main valve and operative for controlling the pressure relief operation of the main valve.

Another object is to provide a relief valve of the character aforesaid, wherein the response of the pilot valve is adjustable such as to afford regulation of the relief valve function, and wherein the main valve is constructed such as to have a fluid metering action in its pressure relief operation.

Other objects and advantages of the present invention will appear from the following description of a presently preferred embodiment thereof, exemplified in the accompanying drawing, wherein.

Figure 1:
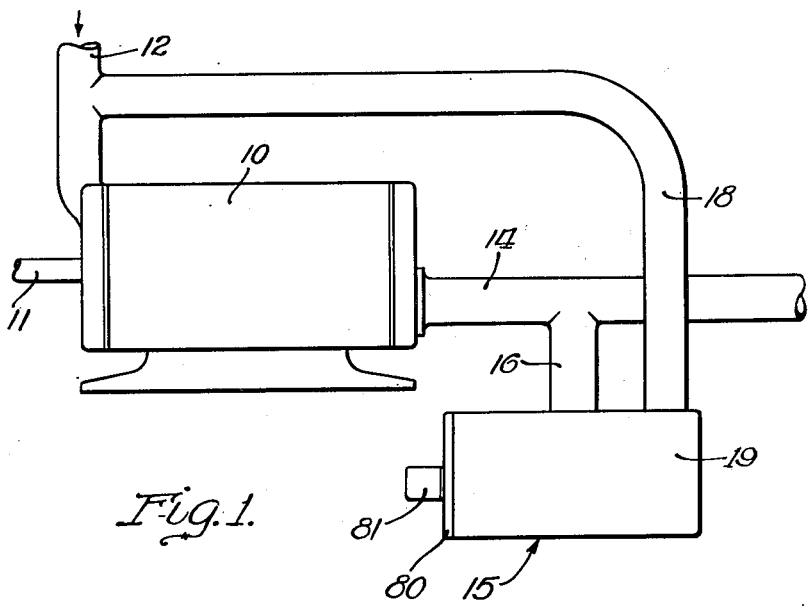
Figure 1 illustrates diagrammatically, a portion of a high pressure hydraulic system in which the presently improved relief valve may be employed, the view showing a fluid pump and the valve of the present invention arranged at the pump discharge end and connected to the pump intake for return of fluid thereto.

Referring first to Figure 1, 10 is a fluid pressure pump which may be of any suitable or known construction, the pump being driven through its drive shaft 11 from any suitable source of power such as an internal combustion engine, electric motor or the like (not shown). Fluid input to the pump is by way of an admission conduit 12, while the high pressure discharge of the pump is conveyed through a delivery conduit 14 to a fluid operated motor or other hydraulic apparatus to be actuated by high pressure fluid. In a hydraulic power system such as is here suggested, the fluid under discharge from the pump may rise in pressure above a predetermined maximum for which the pump and system may be designed. This may result for example, from blockage of the delivery line 14 or other obstructions in the system beyond the pump 10.

In order to prevent damage to the pump and also to other elements of the hydraulic system, excessive fluid pressure when occurring in the delivery conduit 14, is relieved through a relief valve device arranged for by-passing a part of the pump discharge, which by-passed fluid may be led to a fluid sump (not shown) supplying the pump 10, or to the pump input conduit 12 as shown in Fig. 1. In this view, the relief valve 15 has its input connected to pump discharge conduit 14, as through branch conduit 16, while the valve by-pass discharge is conducted through conduit 18 to the pump inlet conduit 12.

Figure 3:
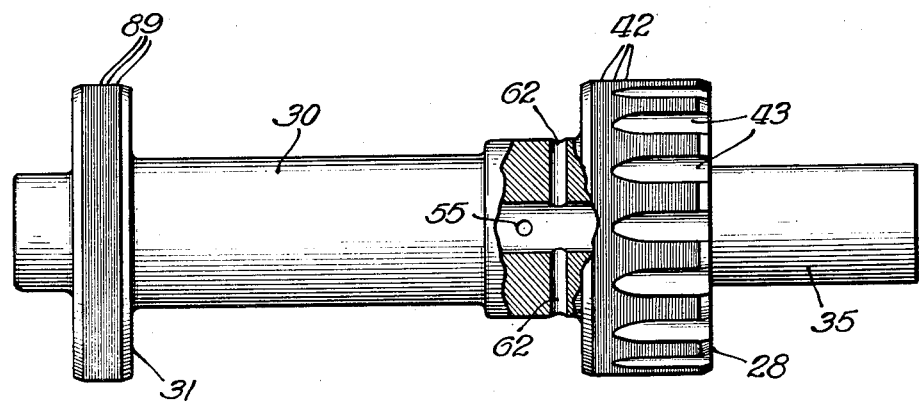
Figure 3 is an elevational view of the main valve member with a portion thereof shown in section.
Figure 3A:
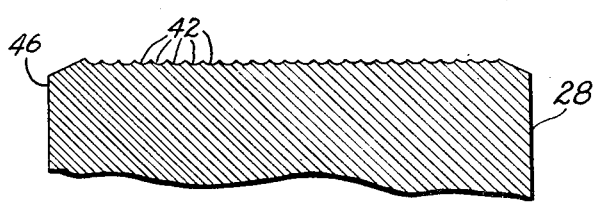
Figure 3a is an enlarged fragmentary view in section, of a peripheral portion of the main valve member, showing the annular sealing grooves formed therein.
Figure 2:
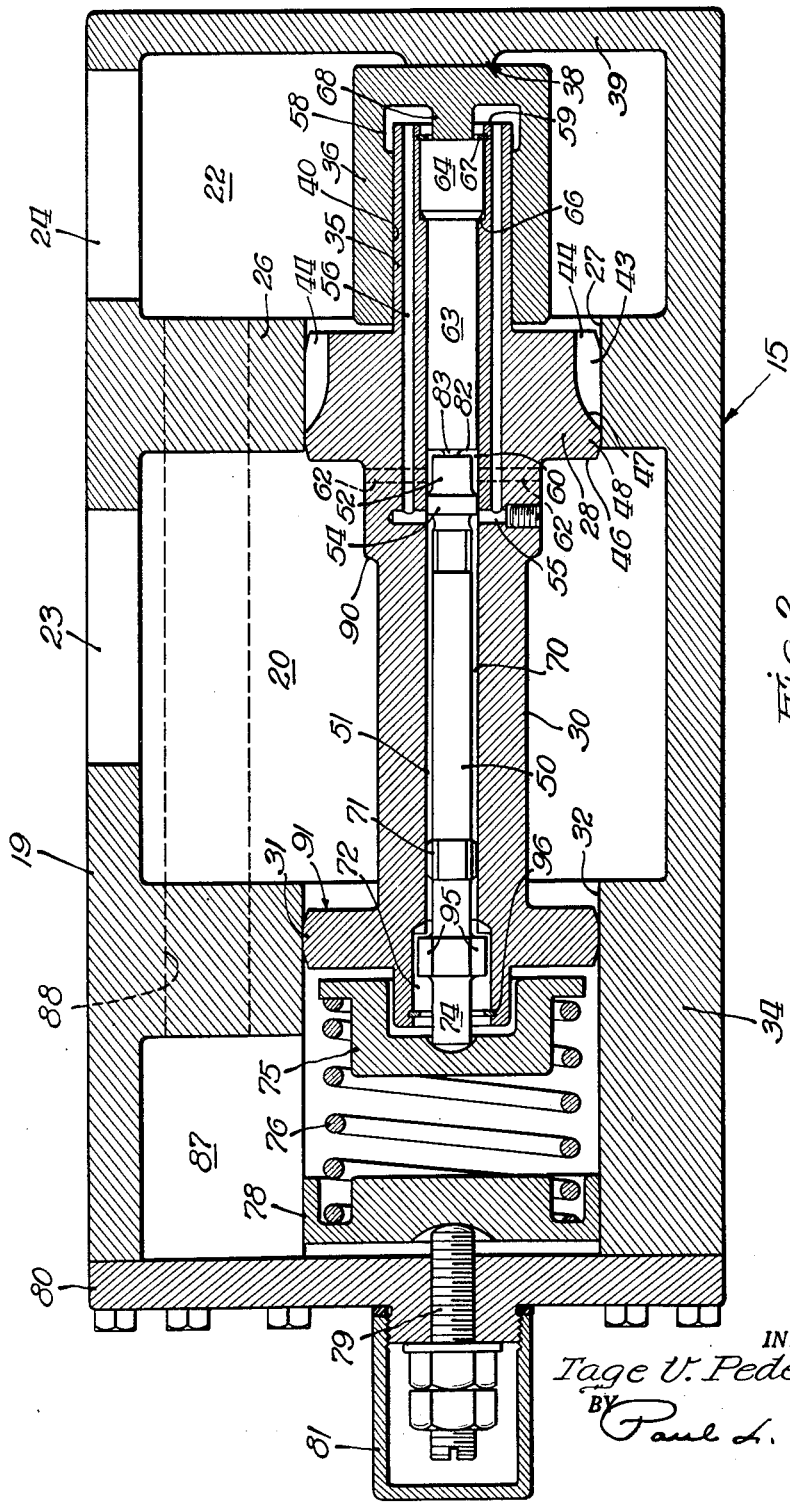
Figure 2 is a view in longitudinal section, of a presently preferred form of the relief valve.

With reference now to Figures 2 and 3, the presently improved relief valve according to the preferred embodiment thereof, includes a valve casing 19 providing a central chamber 20 and an end chamber 22. Provided in the wall of the casing 19 is an inlet port 23 for chamber 20, this port being in fluid receiving connection with the conduit 16 (Fig. 1) leading from the discharge side of pump 10. The casing wall further has a port 24 associated with chamber 22, this port being connected through conduit 18 with the input conduit 12 of pump 10. Thus it will appear that chamber 20 receives high pressure fluid from the pump 10, while chamber 22 is the by-pass or return chamber of the valve. Interiorly of valve casing 19 and separating the chambers 20 and 22, is a partition or wall 26, the wall being formed to provide a circular opening or passage 27 constituting a port for intercommunicating the chambers 20 and 22.

In control of port 27 is a main valve member 28 fixed to or formed integrally with a main valve spindle 30. Spindle 30 extends from valve member 28 through the chamber 20 and terminates in a combined valve guide and piston head 31 slidably received in a bore 32 formed in the valve casing end portion 34. An extension 35 of the spindle projects from the opposite side of main valve member 28 into chamber 22. This extension supports thereon a cap member 36 which normally abuts an internal boss 38 provided on the casing end closure 39, the latter preferably being provided as an integral end wall of the casing, as shown. For a purpose to appear, the cap member 36 constitutes a cylinder, while the spindle extension 35 constitutes a piston which is closely slidably received in the bore 40 of the cylinder 36.

The main valve member 28 is shown in the form of a cylindrical plug longitudinally slidable in the port passage 27, with the plug valve sealed against leakage as through the instrumentality of a plurality of annular grooves 42 (Figure 3) formed in the periphery of the valve member. In addition, the peripheral portion of the valve is provided with a plurality of preferable equally angularly spaced notches or recesses 43 which may be formed by a milling operation, each of these grooves opening at their ends 44 to the chamber 22. The grooves 43 do not extend transversely through the valve member 28, but terminate inwardly of the forward face 46 of the valve member, in the outwardly curving bottom surfaces 47 merging with the peripheral surface of valve portion 48. Thus it will appear that each of the grooves 43 is open peripherally of the valve member, with gradual restriction of such opening in the approach of each groove to the surface of valve section 48, as this clearly appears in the view of Figure 2. The purpose served by the groove 43 will appear presently.

Embodied in the main valve structure as hereinabove described, is a pilot valve for initiating and controlling pressure relief operation of the main valve. The pilot valve is here shown to be comprised of a spindle element 50 extending in a longitudinal bore 51 provided through the spindle 30 of the main valve, spindle 50 having formed on its inner end portion 52, a cylindrical enlargement 54 constituting the pilot valve element. The pilot valve element 54 is arranged to cooperate with ports 55 opening laterally from the spindle bore 51, each of these ports in turn, being connected by a passage 56 extending longitudinally in the main valve and its extension or piston 35, to the chamber or space 58 formed by the cap member or cylinder 36 at the end face 59 of spindle piston extension 35. The pilot valve is subjected to the pressure of the fluid in chamber 20 through communication of the pilot valve chamber 60 with chamber 20 by way of one or more radial passages 62 (Figure 3) in main valve spindle 30. Chamber 60 is formed in part by a plug member 63 in the portion of the bore 51 extending through spindle piston extension 35 and the valve member 28.

The plug 63 has an enlarged head 64 seated against an internal shoulder 66 and retained in place by a snap ring 67. Moreover, the head 64 of plug 63 provides an abutment for an internal boss or abutment extension 68 of the cylinder 36.

The pilot valve spindle 50 is of a diameter appreciably less than the diameter of bore 51, such as to provide an annular, longitudinally extending passage 70 for a purpose to appear. Spindle 50 is guided in the bore 51 by valve head 54 and by a guide sleeve 71, the latter being of spider form such that it does not close the longitudinal passage 70. The rear end of spindle 50 projects outwardly through an enlarged bore 72 in main spindle 30, and has its end 74 in engagement with a spring supported cup member 75, the latter receiving one end of a compression spring 76. The opposite end of spring 76 is carried by a similar support 78 which is centrally engaged by an adjusting screw 79 extending through the opposite closure member 80 of the valve casing 19 and having its exposed end and clamping nuts thereon, enclosed by a removable cap 81. The spring 76 thus loads the pilot valve, biasing the same inwardly of the bore 51 such as to bring the valve head 52 to a position adjacent face 82 of the plug 63. The inward bias of the pilot valve is limited by abutment of the pilot valve head 52 with a projection 83 on face 82 of plug 63 such as to determine a spaced apart relation of the pilot head 52 and plug end face 82. For a purpose to appear, bore 32 communicates with a casing pocket 87, and the latter is in communication with casing chamber 22 through a passage 88 formed in casing 19, the passage being shown in broken lines in Fig. 2. It is to be noted here also, that the valve head 31 may be sealed in its sliding position in bore 32, in the manner effected in connection with the valve head 28, as by providing a plurality of annular grooves 89 (Fig. 3) in the peripheral surface of the head 31.

The operating parts of the relief valve occupy substantially the relative positions as illustrated in Figure 2, in the absence of abnormal fluid pressure in chamber 20. In such relative positions, the pilot valve element 54 is interposed between chambers 60 and the ports 55, as substantially in the position shown. Now upon pump delivery of high pressure fluid through discharge conduit 14, the chamber 20 of the relief valve structure will become completely filled with high pressure fluid admitted through the branch conduit 16. Also, fluid from chamber 20 will pass through the passages 62 into the pilot valve chamber 60, the fluid under pressure in the latter chamber reacting against the face 82 of plug 63, tending to cause displacement of the pilot valve against the opposing force of spring 76. With the fluid in chamber 20 at the desired normal high pressure of the hydraulic system, the pressure reaction on the pilot valve will be insufficient to produce pilot valve displacement against spring 76 because the latter is adjusted to impose a counter or biasing force sufficient to maintain the pilot valve in the position indicated. Under the condition of normal pressure in the system, the main valve 28 will remain in its port closing position as shown, under the influence of fluid pressure acting against its face 46 and the face 82 of plug 63, the combined areas of these face portions together with the face 90 of the main valve spindle, being greater than the area of face 91 of the valve head 31. Thus under normal operating conditions, the relief valve will be closed to prevent by-passing of fluid as to the inlet side of the pump 10. However, in the event of abnormal pressure rise in the fluid under discharge from pump 10, the increased pressure will cause displacement of the pilot valve such as to open ports 55 and hence admit fluid under pressure through these ports and the passages 56, to the cylinder chamber 58. The fluid under pressure thus admitted to chamber 58, exerts a displacing force against the face 59 of the valve spindle piston 35. Such force in cooperation with the pressure against face 91 of the valve head 31, produces opening displacement of the main valve 28, with displacement thereof continuing until the constricted ends of the valve grooves 47 open to chamber 20. This occurring, fluid under pressure in chamber 20 will pass through grooves 43 and port 27 to chamber 22, and thence through conduit 18 to the intake side of the pump, thereby relieving excess pressure in the system. Because of the constriction of the forward ends of the valve grooves 43, it will appear that in the initial opening of the main valve, only a corresponding small degree of fluid by-pass will occur, while upon continued opening movement of the main valve, a progressively greater by-passing of fluid takes place. Consequently, there is avoided any sudden exposure of a large area opening at the port 27 to fluid by-pass, the bypassing function here occurring in a gradual manner, with increased by-pass in proportion to exposure of wider portions of the grooves 43 upon further opening displacement of the main valve 28.

In relieving excess pressure as above described, once the pilot valve is moved to open ports 55, it remains in a position of actuation corresponding to the balance of forces acting on the pilot valve, these opposing forces being the excess of fluid pressure and the force of the then compressed spring 76. Consequently, as the main valve 28 responds to open port 27, movement thereof returns the ports 55 to a position of closure by the pilot valve element 54, whereupon further opening movement of the main valve ceases, with fluid under pressure trapped in the passages 56 and chamber 58. Hence the extent of by-pass opening thus effected, is only such as to relieve the excess of pump pressure discharge, and this open condition is maintained until a change occurs in the degree of excess pressure discharge from the pump. For example, when in the above open condition of the by-pass, the cause of the excess pressure is reduced or removed, the resultant return of fluid pressure in chamber 20 toward or to the predetermined normal value, permits spring 76 to displace the pilot valve relative to the main valve and in the direction to open ports 55 to passage 70. This releases the trapped fluid from the chamber 58 and passages 56 to the low pressure chamber 87, thereby allowing the pressure in chamber 20 to move the main valve toward closed position.

The action of the relief valve thus is not only positive, but is in the nature of a step-by-step positionment of the plug valve. Under a relatively small pressure rise above normal pressure in chamber 20, the pilot valve will be displaced to the left as viewed in Fig. 2, to a correspondingly small extent, coming to rest at balance of the spring force with the excess of pressure causing the indicated pilot valve movement. Resultant hydraulic actuation of the main plug valve following pilot valve displacement, as to the left in Fig. 2 toward relief port opening, brings the ports 55 into closure by the pilot valve head 54, whereupon the plug valve becomes hydraulically locked (through the pressure fluid trapped in the cylinder chamber 58) in a position metering excess fluid pressure from chamber 20 to chamber 22 and the by-pass line extending therefrom. In response to each successive increase in the excess of pressure in chamber 20, should such occur, the relief valve will function exactly as above described, with the pilot valve assuming a new position in each case, and the plug valve attaining a new hydraulically locked open position corresponding to the new position of the pilot valve. The reverse of the above relief valve opening steps takes place with decreases in the excess pressure, until return of the pressure in chamber 20 to normal value when the plug valve will be completely closed. In the reverse action to close the plug valve, the operation differs only in that with each positionment of the pilot valve (in movements to the right as viewed in Fig. 2), the ports 55 are opened to the exhaust line 70 whereby to release some of the trapped pressure fluid in chamber 58, thus causing the plug valve to follow in the direction of pilot valve movement until the ports 55 come into closed relation to the pilot valve head 54. At that point, the plug valve is again locked in a position corresponding to pilot valve position.

As shown in Fig. 2, the pilot valve stem 50 is provided with one or more radial projections or fingers 95 which coact with a snap-ring stop 96 to limit displacement of the pilot valve in the direction to open ports 55 to chamber 60. The fingers 95 and snap ring 96 serve a further purpose as will appear presently.

Upon relief of excessive fluid pressure through the valve and the restoration of pressure in the system to its normal value, the pilot valve in response to the decrease in fluid pressure and under the urging of its spring 76, will again close the ports 55 to chamber 60, while the main valve 28 returns to port closing position. As the pilot valve head 54 moves inwardly of bore 51 to its normal position, it will open the ports 55 to the bore passage 70 as shown in Fig. 2, thereby permitting discharge of the high pressure fluid from the chamber 58 through passages 56, ports 55, passage 70, bore 72, bore 32, pocket 87 and passage 88 to the low pressure or by-pass chamber 22.

From the foregoing, it will now appear that the presently improved pressure relief valve affords pilot controlled actuation of the main valve member such that the by-passing function occurs smoothly and without sudden large-area opening of the by-pass. The latter factor is in consequence of the shape of the main valve grooves 43 and the constriction of the inlet ends thereof, which characterizes the main valve as having a gradual or metering relief function, which is highly desirable in high pressure system as herein contemplated.

It is to be noted here that in constructing the by-pass valve in accordance with the present invention, the movable valve structure is formed such that the effective area of the face 31 of valve guide head 91 is greater than the sum of the areas of valve faces 46 and 90, but is less than the combined areas of faces 46, 90 and the face 82 of plug 63. This relationship of the valve pressure areas is necessary to the normal function of the valve as hereinabove described, and serves importantly through the relation of the plug face 82 and the pilot valve 54, to cause valve opening under abnormal high pressures in chamber 20, in the event the pilot valve sticks in the stem 30 or the cylinder 36 sticks on the spindle extension or piston 35. Assume for example, that the pilot valve becomes stuck in the position shown in Fig. 2. So long as the fluid pressure in chamber 20 does not exceed the predetermined maximum for which the pilot valve is set through its biasing spring 76, the by-pass valve will remain closed. However, upon abnormal rise in fluid pressure in chamber 20, the valve-closing effect of the pressure against plug face 82 is nullified because of the immovable or stuck condition of the pilot valve. Consequently, the by-pass valve will open in reaction to the fluid pressure on face 91 of the valve guide head 31 (since the area of that face is greater than the areas of faces 46 and 90), but opening will occur only when the abnormal pressure in chamber 20 rises to a point sufficient to overcome the counter-force of spring 76 which is then effective on the valve because of the stuck condition of the pilot valve. Thus the by-pass valve will function to relieve excessive pressures even though the pilot valve should become stuck.

Now in the event the cylinder 36 sticks on the piston 35 or for any reason becomes in effect, rigid with the latter, while the pilot valve is free to move, the by-pass valve will operate nevertheless, to relieve excessive pressures. In such event and upon abnormal rise in fluid pressure in chamber 20, the pilot valve will be displaced, compressing spring 76 until the finger elements 95 on pilot valve stem 50 engage the snap ring 96. The pilot valve then is in effect, fixed to the main valve, so that when the pressure in chamber 20 acting against the area of valve guide head face 31, rises sufficiently to overcome the bias of spring 76 under its then compressed condition, the by-pass valve will be opened to relieve the excessive pressure in the system.

The foregoing examples relate only to abnormal conditions of the by-pass valve, but indicate clearly that the valve of the present invention is fully capable of and adapted for operation to relieve excessive fluid pressures in the system even in the event certain of the valve operating parts, as the pilot valve 54 or the cylinder 36, become inoperative in respect to their normal intended functions.

Having now described and illustrated a presently preferred embodiment of the invention, what I desire to claim and secure by Letters Patent is:

1. A pressure-relief valve for a hydraulic power transmission system, the valve comprising a valve casing providing high and low pressure fluid chambers and a wall separating the chambers, said wall having a port-forming passage therethrough for communicating the chambers, a plug valve slidably received in said passage and having a side face exposed in said high pressure chamber, a piston on said plug valve and projecting in said low pressure chamber, a cylinder separate from said valve casing and arranged in relative sliding support on said piston, said cylinder having a head portion and a piston abutment internally of the cylinder on said head portion, a cylinder stop in said low pressure chamber, said plug valve under normal fluid pressure conditions in said high pressure chamber, being displaced in said passage to a passage-closing position wherein said piston is in engagement with said piston abutment and said cylinder is positioned in engagement with said cylinder stop, and means for admitting fluid pressure to said cylinder for effecting displacement of said piston to produce passage-opening displacement of said plug valve, said means including a valve chamber in said plug valve and open to said high pressure chamber, a passageway through the plug valve and said piston open at one end to said cylinder and terminating at its opposite end in a port at said valve chamber, and a pilot valve in said valve chamber and normally positioned therein to interrupt fluid flow communication between said valve chamber and port, said pilot valve being displaceable from its said normal position responsively to abnormally high fluid pressure in said high pressure chamber, such as to open said port to the valve chamber for the admission of fluid pressure to said cylinder, and said plug valve having recesses in its periphery, each recess being closed to said side face of the valve and gradually restricted in the direction of said side face, said recesses coacting with said port-forming passage in passage-opening displacements of the plug valve, to meter pressure-relief flow of fluid from the high pressure chamber past the plug valve to the low pressure chamber.

2. A pressure-relief valve as defined in claim 1, characterized further by means forming a passageway between said low pressure chamber and said port and open to said port when said pilot valve is in its normal position interrupting flow communication between the port and the said valve chamber, for venting high pressure fluid from said cylinder.

3. A pressure-relief valve as defined in claim 1, characterized further by yieldable means engaging the said pilot valve and biasing the same toward its said normal position interrupting flow communication between the said port and valve chamber.

4. A pressure-relief valve as defined in claim 1, characterized further by means including a compression spring, acting on the said pilot valve to bias the same to its said initial position interrupting flow communication between the said port and valve chamber, and means accessible externally of the said valve casing, for regulating the compression of said spring.

5. An excess pressure relief valve of the character disclosed, comprising a valve casing providing adjacent high and low pressure fluid chambers and a wall separating the chambers, said wall having a port-forming passage between the chambers, a valve member in control of said port-forming passage and including a hollow valve stem having a port therein open to said high pressure chamber, a piston on said valve member projecting in said low pressure chamber, a cylinder member normally in abutment with a wall of said valve casing and receiving said piston therein, the cylinder and piston forming a cylinder chamber, said valve member and piston having a passage open at one end to said cylinder chamber and terminating at its other end in a port opening to the hollow valve stem at a point relatively adjacent the first said port, a pilot valve in said hollow stem having a valve element cooperable with the second said port, a pressure relief passageway between the said second port and said low pressure chamber, and yieldable means urging said pilot valve to a position locating its valve element between said ports with the second said port open to said passageway, said pilot valve responding to above-normal fluid pressure in said high pressure chamber, by displacement thereof against said yieldable means and to a position of balance, thereby opening the second said port to the first said port for admitting fluid pressure through said passage to said cylinder chamber for effecting fluid pressure displacement of the piston and valve member to open said port-forming passage, said displacement of the valve member continuing to a position of closure of the second said port by said pilot valve element, thereby to entrap pressure fluid in the cylinder chamber and maintain said valve member in an open position corresponding to the position of balance of said pilot valve.

6. An excess pressure relief valve of the character disclosed, comprising a valve casing providing adjacent high and low pressure fluid chambers and a wall separating the chambers, said wall having a port-forming passage between the chambers, a valve member in control of said port-forming passage and including a hollow valve stem having a port therein open to said high pressure chamber, a piston on said valve member projecting in said low pressure chamber, a cylinder member in telescopic support on said piston and having a cylinder head normally in abutment with a wall of said valve casing, the cylinder and piston forming a cylinder chamber, said valve member and piston having a passage open at one end to said cylinder chamber and terminating at its other end in a port opening to the hollow valve stem at a point relatively adjacent the first said port, a pilot valve in said hollow stem having a valve element cooperable with the second said port, a pressure relief passageway between the said second port and said low pressure chamber, and yieldable means urging said pilot valve to a position locating its valve element between said ports with the second said port open to said passageway, said pilot valve responding to above-normal fluid pressure in said high pressure chamber, by displacement thereof against said yieldable means and to a position of balance, thereby opening the second said port to the first said port for admitting fluid pressure through said passage to said cylinder chamber for effecting fluid pressure displacement of the piston and valve member to open said port-forming passage, said displacement of the valve member continuing to a position of closure of the second said port by said pilot valve element, thereby to entrap pressure fluid in the cylinder chamber and maintain said valve member in an open position corresponding to the position of balance of said pilot valve.

References Cited in the file of this patent

UNITED STATES PATENTS

| | | |
|---|---|---|
| 72,204 | Kelly | Dec. 17, 1867 |
| 191,078 | Scovell | May 22, 1877 |
| 235,748 | Crisp | Dec. 21, 1880 |